United States Patent [19]
Borner

[11] 3,765,287

[45] Oct. 16, 1973

[54] APPLIANCE FOR CUTTING FRUITS

[76] Inventor: Alfred Borner, Pickliessemer Str. 3, Dudeldorf, Eifel, Germany

[22] Filed: Oct. 19, 1971

[21] Appl. No.: 190,626

[30] Foreign Application Priority Data
Oct. 22, 1970  Germany............... P 20 51 780.0

[52] U.S. Cl.............. 83/407, 83/404.4, 83/437, 83/425.2
[51] Int. Cl............................................. B26d 3/26
[58] Field of Search ............... 83/4, 407, 467, 431, 83/858, 569, 404.4, 437, 425.2, 425.3

[56] References Cited
UNITED STATES PATENTS
269,835   1/1883   De Puy et al.................. 83/569 X
2,487,431   11/1949   Floyd............................ 83/857 X

*Primary Examiner*—Willie G. Abercrombie
*Attorney*—Donald D. Jeffery

[57] ABSTRACT

An appliance is provided for cutting tomatoes or other fruits into slices by reciprocating movement with the simultaneous application of pressure. The appliance comprises parallel saw blades fixed in a frame which is V-shaped in end view. The blades each have their cutting edges extending substantially vertically, the cutting edges of adjacent saw blades lying at different heights.

9 Claims, 6 Drawing Figures

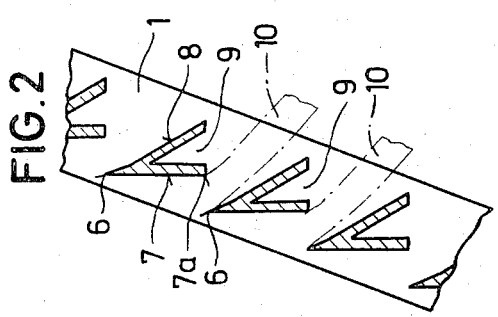

3,765,287

APPLIANCE FOR CUTTING FRUITS

BACKGROUND OF THE INVENTION

This invention relates to an appliance for cutting tomatoes or similar fruits, comprising parallel saw blades fixed in a frame, on to which blades the fruits are pressed while being simultaneously moved backwards and forwards and are thereby cut into slices.

With known cutting applicances of this type, the saw blades which consist of metal, lie in a plane in parallel juxtaposition and are anchored in a synthetic plastics frame. However, the fitting of the metal blades in the synthetic plastics frame is complicated and requires particular care and accuracy so as to ensure that the saw blades always have the necessary tension. Moreover, the fruits can move laterally during the cutting operation, so that in certain circumstances the cut is inaccurate.

It is an object of the invention to avoid these disadvantages and to provide a cutting appliance for tomatoes or the like, which can be produced entirely from one material, preferably from synthetic plastics.

SUMMARY OF THE INVENTION

According to the present invention there is provided a cutting appliance for fruits, comprising a frame which is V-shaped in end view, and an array of saw blades arranged in the frame and having cutting faces extending substantially vertically, cutting edges of adjacent saw blades lying at different heights, the array of saw blades being adapted to receive the fruits which are to be cut and to permit reciprocation of the fruits thereon with the simultaneous application of pressure thereto.

By this means, it is possible for both the frame and the saw blades arranged in the latter to be produced in one piece from for example synthetic plastics material. The blades, on account of their particular arrangement, can be widened out downwardly, without the cutting gap remaining between the blades being constricted for the passage of the severed slices. Thus, it is possible for the slices already cut off to move towards the sides because of the V-shaped construction of the frame. However, since the fruits to be cut lie in the V-shaped frame during the reciprocating movement, the fruits themselves cannot move laterally before they are not cut. In this way, there is obtained a cutting appliance which can be manufactured in one piece having saw blades made of synthetic plastic material of sufficient strength, which do not require to be tensioned or re-tensioned, with which tomatoes or similar fruits, with which a saw cut is necessary, can be cut into slices more quickly and more cleanly than hitherto.

The cutting appliance according to the invention is preferably equipped with a holder for the fruit, which holder can be partially moved between the saw blades. This ensures that the fruits can be cut to the last piece without there being any danger of injury to the user. It is preferable for the fruits to be initially placed in position by hand and the cutting operation will only be commenced with manual assistance. It is only when the fruit is substantially cut that the assistance of the fruit holder will be used in order to cut the last remains of the fruit.

According to one preferred embodiment of the invention, the cutting edge of each saw blade is arranged approximately at the same height as the bottom edge of the cutting surface of the saw blade next above it, or somewhat lower. This ensures that the individual separated slices are unable to move laterally until the next following cut has commenced, whereupon the now completely severed slice is able to move laterally in order to make possible an enlargement of the blade in a downward direction. Each blade may for example be made wedge-shaped in cross-section and have a guide surface extending obliquely outwards for severed slices, while its cutting surface extends vertically and parallel to the cutting surfaces of the other blades arranged in the V-shaped frame. Each of these wedge-shaped saw blades can comprise a recess on the underside, whereby its stability is improved, material and weight are saved, and a substantially uniform wall thickness is obtained, this being important for a uniform solidification of the synthetic plastics material.

In another embodiment of the invention, each saw blade has the shape of a parallelogram in cross-section, its upper long side serving as an outwardly extending guide surface for severed slices, while the cutting edge extends vertically and lies parallel to the cutting edges of the other parallelogram shaped saw blades. This constructional form of the saw blades also ensures that the fruits are cut into exactly parallel slices, but the severed parts of the slices can move out laterally, so that the downwardly increasing thickening of the separate saw blades does not narrow the passage slots for the separated slices.

Where a fruit holder is provided this is preferably mounted on a guide arrangement which is disposed on one face of the appliance. As a result, the fruit holder is connected to the cutting appliance so that it cannot be lost, but can be used at any time in the required manner. This guide arrangement can be constructed as a handle for the complete cutting appliance.

The guide device for the fruit holder may for example be fixed on one end wall of the cutting appliance and comprise a guide channel. This guide channel preferably accommodates a displacable shaped rod on the free end of which the fruit holder is arranged so that it can be hinged upwardly. This fruit holder can be a shell or a bowed member with a convex underside and is provided with longitudinal slots corresponding to the saw blades of the cutting appliance. Even more advantageously; the fruit holder can have on its underside pins which are of different length and point vertically downward, which pins are pressed on to the upper side of the fruits which are to be cut and can engage between the saw blades. In each case, the fruit holder can be fitted with an upwardly projecting handle, so that it can be more conveniently operated.

According to another embodiment of the invention, the V-shaped frame with the saw blades and the fruit holder, are each injection-moulded in one piece from synthetic plastic material. In this way, the two main parts of the cutting appliance can be manufactured and assembled without any complicated fitting, for it is merely necessary for the fruit holder to be connected to the shaped rod serving for guiding purposes by means of a hinge pin or the like and then to fit this guide rod into the corresponding guide channel on the V-shaped frame. The cutting appliance is then fully assembled and can be immediately used.

Embodiments of a cutting appliance for tomatoes or the like in accordance with the invention are shown diagrammatically in the drawings.

BRIEF DESCRIPTION OF THE DRAWINGS

FIG. 2 is an end view of three saw blades which are arranged alongside and above one another and which have a wedge-shaped cross-section, FIG. 3 is a view similar to FIG. 2, showing saw blades having an approximately parallelogram-shaped cross-section, FIG. 4 is a side elevation of the fruit holder of the cutting appliance with the guide means for said holder, FIG. 5 is a section on the line V—V of FIG. 4, and FIG. 6 is a front view of the fruit holder, from which it is possible to see the arrangement of pins on the said holder, which pins are able to pass at least partially between the blades disposed at the lowest position.

DESCRIPTION OF PREFERRED EMBODIMENTS

Figure 1:
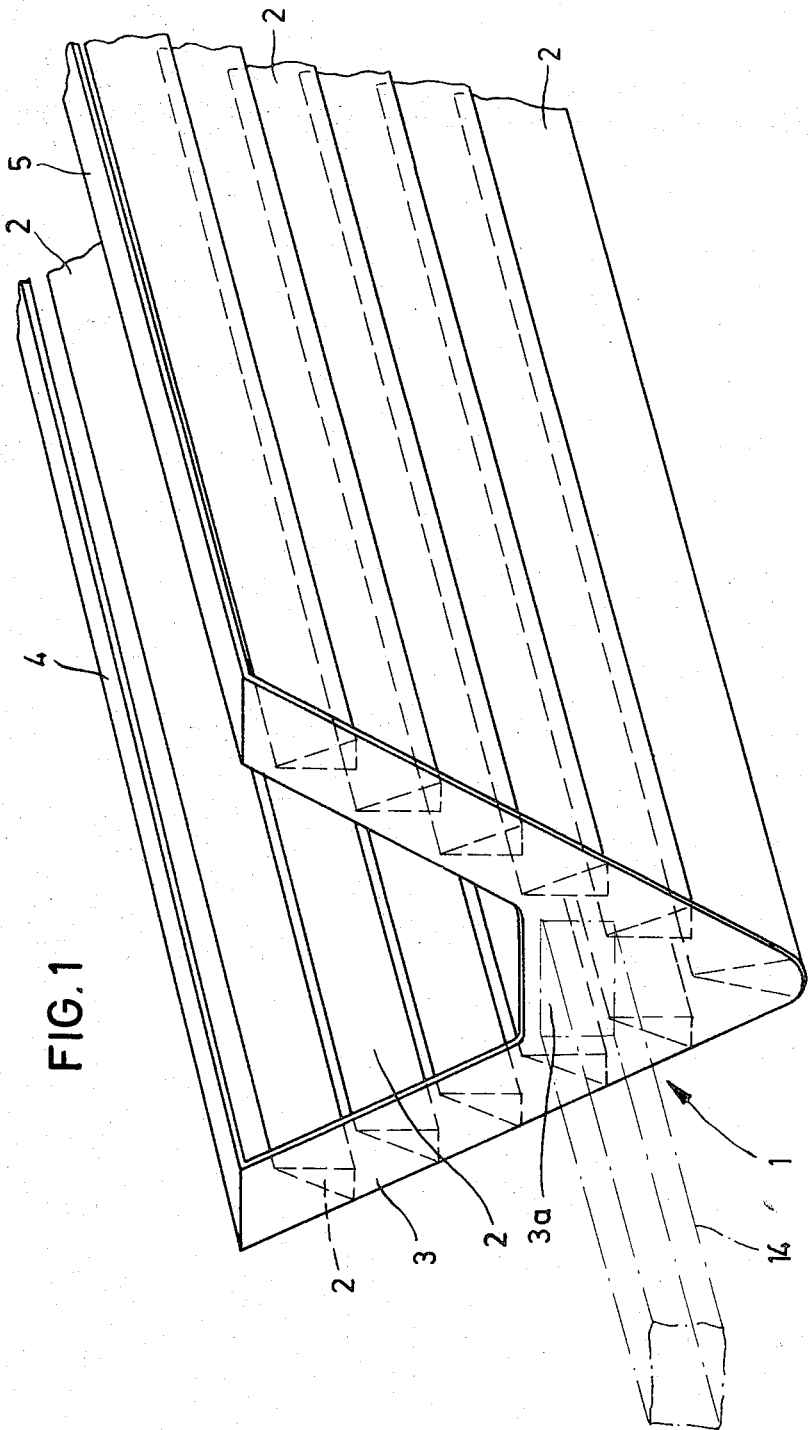
FIG. 1 is a perspective view of one end of the cutting appliance.

The cutting appliance according to the invention for tomatoes or similar fruits comprises a frame 1 which is V-shaped in end view and in which are formed in one piece longitudinally extending saw blades 2. Because of the V-shaped construction of the frame 1, these saw blades are arranged juxtaposed and offset in stepped formation, as shown in FIGS. 1 to 3. The frame 1 comprises two partially open end walls 3, which are connected to one another by means of upper longitudinal supports 4 and 5 and the moulded blades 2 which extend between them. However, as stated, all parts of the frame and the blades arranged therebetween are made in one piece, so that the appliance as a whole has sufficient rigidity and stability.

The saw blades 2 shown in FIG. 2 are wedge-shaped in cross-section, each saw blade 2 having an upper cutting edge 6 made in the form of a saw, a vertically extending smooth cutting surface 7 and a slightly curved rear side 8 which extends obliquely outwards. On the underside, these wedge-shaped saw blades are formed with a wedge-shaped recess 9, whereby the stability is improved, material and weight are saved and a practically constant wall thickness is produced, this being of importance for uniform solidification of the saw blades without any distortion. FIG. 2 also shows that the cutting edges 6 of adjacent saw blades 2 are so arranged relatively to one another that the cutting edge of each saw blade is approximately at the height of the bottom edge 7a of the cutting surface 7 of the saw blade next above it. As a result, the fruit is supported against lateral movement on the side already severed until the next cut has been made, whereupon the now completely separated slice 10 is immediately able to move out laterally and hence is not compressed between adjacent blades or damaged in some other way.

The saw blades shown in FIG. 3, have a cross-section approximately in the form of a parallelogram, each saw blade once again having an upper cutting edge 11 formed in the manner of a saw, a vertically extending cutting surface 12 and a slightly curved rear side 13 which extends obliquely outwards. The bottom edge 12a of the cutting surface 12 is in each case disposed at the height of the upper cutting edge 11 of the next lower saw blade, which ensures as in the blades shown in FIG. 2 that exactly parallel cuts are made, but the severed slices of the fruit are able to move outwardly immediately after the second separating cut.

Formed on one end wall 3 of the frame 1 in a lower closed region 3a is an outwardly projecting guide arrangement 14 with a shaped guide groove or channel 15, which accommodates a displaceable shaped rod 16. The rod 16 is displaceable axially and its free end 17 projects into the internal space of the cutting appliance or of the frame 1, as shown in FIG. 4. Pivoted on this free end 17 by means of a simple joint 18 is a fruit holder 19 having an underside which is of convex form and which carries on its upper side a member 20 serving as a handle. This fruit holder 19 has pins 22 and 23 of different lengths which are separated from one another by spaces 21, it being possible for the said pins to engage between the individual saw blades 2 arranged in the lowest portion on the frame 1, so that in this way the fruits which are to be cut are pressed securely downwardly and also completely over the saw edge of the lowermost saw blade 2 and are completely cut up. The pins 22 and 23 are connected by means of a plate 24 to the fruit holder.

As illustrated, the underside of the fruit holder 19 is made convex. It is most expedient for the ends of the pins 22 and 23 not to lie on a curved path, but on two planes 19a and 19b which extend at an obtuse angle to one another, as shown in FIG. 4, so that this underside of the fruit holder can be readily adapted to any shape and size of the fruit.

The guide device 14 accommodating the guide groove 15 is at the same time formed as a handle for the frame 1, so that the entire cutting appliance can be easily handled.

Various modifications are possible. Thus, it is readily possible to provide two saw blades disposed with their cutting edges at the same height at the lowest point of the V-shaped frame, those sides of the said blades which face one another extending approximately parallel to one another or being undercut downwardly, and their opposite sides extending obliquely outwardly similar to what is shown in FIGS. 2 and 3.

I claim:

1. A cutting appliance for fruits, comprising a frame which is V-shaped in end view, and an array of saw blades arranged in the frame integrally therewith, each of said saw blades being generally wedge-shaped in cross-section and having a guide surface extending obliquely outwardly to guide slices which are severed from the fruit, said blades having cutting faces extending substantially vertically, with the cutting edges of adjacent saw blades lying at different heights, the array of saw blades being adapted to receive the fruits which are to be cut and to permit reciprocation of the fruits longitudinally thereon with the simultaneous application of pressure thereto, and a fruit holder operatively disposed between the saw blades for applying downward pressure on the fruit.

2. An appliance according to claim 1, wherein the cutting edge of each saw blade extends substantially at the same height as a bottom edge of the cutting surface of the next higher blade, with each of said blades being laterally inwardly offset from the blade immediately thereabove.

3. An appliance according to claim 1, wherein each wedge-shaped saw blade has a recess on an underside portion thereof.

4. An appliance according to claim 1, wherein each saw blade is formed approximately as a parallelogram in cross-section, an upper longitudinal side of the parallelogram serving as an outwardly extending guide surface for slices severed from the fruits.

5. An appliance according to claim 1, wherein the fruit holder is pivotally mounted on a guide device which is secured to one end of said frame so as to form a blade for the same.

6. An appliance according to claim 5 wherein said guide device is formed on the interior thereof with a moulded guide groove or channel which accommodates in displaceable manner one end of a shaped rod the other end of which has pivotally connected thereto said fruit holder for permitting upward pivoting movement of said fruit holder relative to said blades.

7. An appliance according to claim 5, wherein said fruit holder has a convex underside and carries spaced pins at the sides having different lengths, said pins being received between the saw blades when said holder is pressed downwardly relative to said frame.

8. An appliance according to claim 7, wherein the fruit holder is equipped with an upwardly projecting handle.

9. An appliance according to claim 1 wherein said blades and said frame are of one-piece construction and formed of synthetic plastic material.

* * * * *